United States Patent [19]

Chamberlain et al.

[11] Patent Number: 5,003,012

[45] Date of Patent: Mar. 26, 1991

[54] NEUTRALIZATION OF POLYMERIC ACID SITES

[75] Inventors: Linda R. Chamberlain; Carl L. Willis, both of Houston, Tex.

[73] Assignee: Shell Oil Company, Houston, Tex.

[21] Appl. No.: 540,397

[22] Filed: Jun. 18, 1990

Related U.S. Application Data

[63] Continuation of Ser. No. 344,947, Apr. 28, 1989, abandoned.

[51] Int. Cl.$^5$ .................................................. C08F 8/44
[52] U.S. Cl. ................................ 525/366; 525/327.8; 525/329.5; 525/329.6; 525/330.2; 525/367; 525/370; 525/371
[58] Field of Search ................ 525/366, 367, 370, 371

[56] References Cited

U.S. PATENT DOCUMENTS

| | | | |
|---|---|---|---|
| 3,113,986 | 12/1963 | Breslow et al. | 260/683.9 |
| 3,264,272 | 8/1966 | Rees | 260/78.5 |
| 3,322,734 | 5/1967 | Rees | 260/79.3 |
| 3,344,014 | 9/1967 | Rees | 161/203 |
| 3,642,728 | 2/1972 | Canter | 260/79.3 |
| 4,090,013 | 5/1978 | Ganslaw et al. | 525/366 |
| 4,226,952 | 10/1980 | Halasa et al. | 525/192 |
| 4,308,353 | 12/1981 | Saito et al. | 525/74 |
| 4,429,076 | 1/1984 | Saito et al. | 525/57 |
| 4,657,971 | 4/1987 | Shiraki et al. | 525/57 |
| 4,797,447 | 1/1989 | Gergen et al. | 525/92 |

FOREIGN PATENT DOCUMENTS 0189672 12/1985 European Pat. Off. .

OTHER PUBLICATIONS

Recent Advances in Ion–Containing Polymers, by M. F. Hoover and G. B. Butler, Journal of Polymer Science, 1974, pp. 1–37.

The Structure and Properties of Ionomers, W. J. Macknight and T. R. Earnest, Jr., Journal of Polymer Science, 1981, pp. 41–122.

*Primary Examiner*—Bernard Lipman

[57] ABSTRACT

The present invention concerns an improved process for producing an ionomer from an acid group containing polymer. Production of the ionomer requires neutralization of an acid functionality or reaction of anhydride functional groups with a metal ion source to produce a salt. It has been found that metal hydrocarbyls or metal hydrides can be used as the source of metal ions for neutralizing the acid or anhydride functionalities. The reaction can occur in a solvent or in a melt, but is most preferably performed in a solvent.

22 Claims, No Drawings

NEUTRALIZATION OF POLYMERIC ACID SITES

This is a continuation of application Ser. No. 07/344,947, filed Apr. 28, 1989, now abandoned.

BACKGROUND OF THE INVENTION

This invention relates to the preparation of a class of functionalized thermoplastic polymers known as ionomers. In one aspect, the invention relates to an improved process for neutralizing acid functionality of a polymeric material to prepare an ionomer. An ionomer is an ion containing polymer.

Ionomeric block copolymers are useful as toughening components in blends with harder but more brittle polymers. U.S. Pat. No. 4,797,447 discloses blends of functionalized block copolymers with polyesters. Copolymers disclosed as useful as toughening components include copolymers of monoalkenyl arenes such as styrene or alphamethylstyrene and conjugated dienes such as butadiene and isoprene.

Blending of elastomeric copolymers, which have not been functionalized, with more brittle polymers often leads to a product which demonstrates little improvement in toughness. The reasons for this are rather well understood and stem in part from the fact that most combinations of polymer pairs are not miscible, although a number of notable exceptions are known. More importantly, most polymers adhere poorly to one another as a result of incompatible structure or polarity. The more brittle polymers are often polar whereas the unfunctionalized elastomeric copolymers are generally non-polar. As a result, interfaces between component domains (a result of their immiscibility) represent areas of severe weakness in blends and, therefore, provide natural flaws and cracks which result in facile mechanical failure.

Elastomeric copolymers containing ionomeric blocks form stronger crosslinkages with some engineering thermoplastics which contain polar functionality than corresponding copolymers which contain acid or other types of functionality. Block copolymers containing ionomeric blocks therefore greatly improve performance as a toughener for these thermoplastics.

Ionomers are not only useful as blend components to toughen engineering thermoplastics which would be otherwise unacceptably brittle, but are also useful as coatings, lubricating oil viscosity index (VI) improvers and adhesives. As coatings, VI improvers and adhesives the ionomers may be useful as blocks within block copolymers, random copolymers, homopolymers or blends with other polymers.

Commercially available ionomers include "Surlyn" (the trade name of an ionomer manufactured and sold by DuPont Co., U.S.A.), "Copolene" (the trade name of an ionomer manufactured and sold by Asahi-Dow Co., Ltd., Japan), "Hi-Milan" (the trade name of an ionomer manufactured and sold by Mitsui Polychemical Co., Ltd., Japan) and Nafion (the trade name of an ionomer manufactured by DuPont Co., U.S.A.).

A wide variety of metal ions are in the prior known to be effective as cations for neutralization of the acid functionality of the modified polymer blocks. Monovalent, divalent, trivalent and quadravalent ions of metals of Groups IA, IB, IIA, IIB, IIIA, IVA, and VIII of the Periodic Table are used. For example, there may be mentioned ions such as $Na+$, $Li+$, $K+$, $Cs+$, $Ag+$, $Ni+^2$, $Mg^{2+}$, $Ca^{2+}$, $Ba^{2+}$, $Zn^{2+}$, $Sr^{2+}$, $Hg^{2+}$, $Fe^{2+}$, $Al^{3+}$ and $Fe^{3+}$. These ions are conventionally reacted with substrate polymers in the form of metal hydroxides, alcoholates, oxides and low carboxylic acid salts.

The reaction of the metal ion source and the acid groups typically takes place in a high temperature melt phase due to the insolubility of the metal ion sources in solvents which will also dissolve the functionalized polymers. When high levels of neutralization are required, the melt phase reaction is particularly undesirable. This is due to a large excess of metal ion source required because of the inefficiency of contact between the functionalized polymer and the metal ion source. The excess of reactants results in higher material costs, and contamination of the product with unreacted excess of metal ion source. Many prior art metal ion sources also result in by-products which contaminate the product. Contamination of product by excess reactants and reaction by-products causes higher haze, and could otherwise be detrimental to product properties.

It is therefore an object of this invention to provide an improved process for preparing ionomers. In one embodiment, it is an object of the invention to provide a process wherein the neutralization of polymer functional groups may be performed in a solution reaction medium. Hence, large excesses of the metal ion source are not required. It is a further object to provide a neutralization process wherein the by-products of the neutralization reaction are easily removed from the reaction medium.

SUMMARY OF THE INVENTION

According to this invention, an improved process for producing ionomers from polymers containing acid or anhydride functionality is provided. The process involves contacting a polymer containing acid functionality with a neutralization agent under conditions effective for neutralization of at least about 5% of the acid functionality. The neutralizing agent is of the formula $MR_x$ where M is a metal ion and R is selected independently from hydrocarbyls and hydrogen. In a preferred embodiment of the invention, a metal hydrocarbyl is added to a solution of a polymer containing acid functionality in a non-protonic solvent. The process of the present invention, in the most preferred embodiment, results in alkane by-products which are easily removed from the reaction medium and therefore do not contaminate the ionomer product.

DETAILED DESCRIPTION OF THE INVENTION

Polymers Containing Acid Functionality

The present invention may be practiced with homopolymers, random copolymers or block copolymers. Copolymers useful for the practice of this invention include linear and star-shaped copolymers. Polymers useful for the practice of this invention include hydrogenated and unhydrogenated polymers.

A preferred embodiment of this invention is to utilize a block copolymer of a monovinyl aromatic and a conjugated diene as the base polymer. Such block copolymers may be block copolymers of varying structures containing various ratios of conjugated dienes to vinyl aromatic hydrocarbons including those containing up to about 60 percent by weight of vinyl aromatic hydrocarbon. Thus, block copolymers may be utilized which are linear or radial symmetric or asymmetric. Linear block copolymers have structures represented by the formulae A-B, A-B-A, B-A-B, B-A-B-A, (AB)$_{0, 1, 2 \ldots}$ BA and the like wherein A is a polymer block of a vinyl aromatic hydrocarbon and B is a polymer block of a conjugated diene or a conjugated diene/vinyl aromatic hydrocarbon tapered copolmyer block. Radial block copolymers may be asymmetrical or symmetrical.

Conjugated dienes which may be utilized to prepare the polymers and copolymers are those having from 4 to 8 carbon atoms and include 1,3-butadiene, 2-methyl-1,3-butadiene (isoprene), 2,3-dimethyl-1,3-butadiene, 1,3-pentadiene, 1,3-hexadiene, and the like. Mixtures of such conjugated dienes may also be used. The preferred conjugated dienes are 1,3-butadiene and 2-methyl-1,3-butadiene (isoprene).

Vinyl aromatic hydrocarbons which may be utilized to prepare copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

The block copolymers used in the present invention are generally prepared from the anionic copolymerization of the aromatic vinyl compounds and the conjugated diene compounds in an inert inactive hydrocarbon solvent, such as hexane, cyclohexane, benzene, toluene and the like, in the presence of, as a polymerization catalyst, an organic lithium compound, such as butyl lithium. In the anionic copolymerization, the block copolymers having various structures can be obtained by changing the monomer addition method or order or by using a polyfunctional lithium compound. Furthermore, the micro structure of the conjugated diene portion of the block copolymer can be changed by the addition of a small amount of polar compounds, such as tetrahydrofuran, diethylene glycol dimethylether and the like. In addition, the block copolymers having active lithium terminal groups, obtained from the above-mentioned methods, can be reacted with polyfunctional coupling agents, such as carbon tetrachloride, silicon tetrachloride and the like, to produce branched or radial type block copolymers. However, it should be noted that the block copolymers of the aromatic vinyl compounds and the conjugated diene compounds derived from any other production processes can be used in the present invention, so long as the molecular structure of the block copolymers are within the range of the above-mentioned limitations.

Hydrogenation of these polymers and copolymers may be carried out by a variety of well established processes including hydrogenation in the presence of such catalysts as Raney nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of an unsupported hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.01 to about 20 percent of their original unsaturation content prior to hydrogenation.

Molecular weights of polymers useful for the practice of this invention may vary widely. Ionomers which can be produced by the process of this invention have molecular weights as low as 1000. These ionomers may be incorporated in, for example, adhesives and coatings. Ionomers in the form of star-shaped copolymers could have as many as 50 arms with molecular weights of each arm up to 200,000, resulting in a polymer with a molecular weight of 10,000,000. Preferable molecular weights for the practice of the present invention range from 20,000 to 500,000 for linear polymer, and preferable molecular weights for the practice of the present invention range from 5,000 to 200,000 per arm with 3 to 50 arms for star-shaped polymers. Most preferable molecular weights for the practice of this invention range from 40,000 to 200,000 for linear polymers and from 10,000 to 60,000 per arm with 4 to 20 arms for star-shaped polymers.

Acid functionality as it is referred to herein includes acid groups pendant to the polymer chain. The acid groups typically are either carboxylic, sulfonic or phosphoric acid. Anhydride groups pendant to a polymer chain may be hydrolyzed to form dicarboxylic acids which are useful in this invention. Some anhydride groups also react directly with metal alkyls to form a salt group and a ketone group.

Acid functionality may be grafted onto a polymer by, for example, sulfonation, free radical grafting or by metalation. Acid functionality may also be inherent in the polymer due to the choice of monomers. Examples are polymethacrylates, polyanhydrides and polyphthalic acids and copolymers which include these polymers. Polymerization of these monomers results in polymers which contain pendant acid functional groups.

Functionalization of a vinyl arene polymer to include carboxylic acid functionality is described in U.S. Pat. No. 4,797,447, the disclosure of which is hereby incorporated by reference. This disclosure describes metallation of the polymer using an alkyl lithium, followed by carboxylation with $CO_2$ to form the lithium salt of the carboxylic acid. The lithium salt may then be acidified by reaction with a proton donor such as water, alcohol or acid to form a carboxylic acid functionalized polymer.

A polymer containing ethylenic unsaturation may be modified by free-radical grafting with a modifier selected from unsaturated carboxylic acids and derivatives thereof. This process is described in more detail by Shiraki et al. in U.S. Pat. No. 4,657,971 and Saito et al. in U.S. Pat. No. 4,429,076 the disclosures of which are hereby incorporated by reference.

A process for grafting sulfonic acid functionality to polymers containing olefinic unsaturation is described by Canter in U.S. Pat. No. 3,642,728, the disclosure of which is hereby incorporated by reference. Sulfonic acid functionality may also be incorporated into a polymer by choosing a monomer containing the sulfonic acid or salt. An example of this process is described in U.S. Pat. No. 3,322,734, the disclosure of which is hereby incorporated by reference. Canter, in U.S. Pat. No. 3,642,728, also discloses a polymer containing -SO$_3$H functional groups and salts thereof. European Patent Application No. 0,189,672 discloses a metallation process whereby styrene containing polymers may be modified to include functional groups of sulfuric acid, or carboxylic acid. European Patent Application No. 0,189,672 is incorporated herein by reference.

The level of functionality in the functionalized polymers useful in this invention may vary considerably. Levels as low as one functional group per polymer molecule, on the average, can affect polymer properties, and levels as high as about 60% w could be practiced. A more preferable levels of functionality is between about 0.5% w and 20% w. Most preferable levels of functionality are between about 0.5% w and 5% w. Levels of anhydride functionality useful for the practice of this invention may vary from as low as one functional group per polymer molecule to 20% w anhydride functionality.

Neutralization Agent

The neutralization agent of this invention may be represented by the formula $MR_x$ where M is a metal ion, each R is selected independently from a hydrocarbyl group or hydrogen and x is an integer from 1 to 4. Metal ions suitable as the metal ion for the practice of this invention include monovalent, divalent, trivalent and tetravalent metals. The choice of valence of the metal depends on the extent of ionic crosslinking desired in the final product. The ionic crosslinking produced by higher valence metal ions can cause gelling of polymer solutions unless solutions are used which are more dilute than those typical for lower valence metal ions. Metal ions useful for the practice of this invention include, but are not limited to, ions of Groups IA, IB, IIA, IIB, IIIA, IVA, IVB, VB, VIB, VIIB and VIII metals of the Periodic Table. Examples of such metals include $Na+$, $Li+$, $K+$, $Cs+$, $Ag+$, $Mg^{2+}$, $Ni^{+2}$, $Ca^{2+}$, $Ba^{2+}$, $Zn^{2+}$, $Sr^{2+}$, $Hg^{2+}$, $Fe^{2+}$, $Al^{3+}$, $Fe^{3+}$, $Ti^{4+}$, $V^{+4}$, $Cr^{+2}$, $Mn^{2+}$ and $Sn^{4+}$. Preferred metal ions include $Na+$, $Li+$, $K+$, $Ni^{2+}$, $Mg^{2+}$, $Ca^{2+}$, $Zn^{2+}$, and $Al^{3+}$.

Neutralization agents suitable for the practice of this invention include any metal hydrocarbyl or metal hydride which would be sufficiently basic to form a salt with a low molecular weight organic acid, such as benzoic acid or p-toluene sulfonic acid.

In the formula $MR_x$, when R is a hydrocarbyl, R can be selected from a wide range of hydrocarbyl groups. R may be an alkyl group, a cycloalkyl group, or an aromatic group. Any molecular weight group may be used, but preferably the hydrocarbyl group contains from one to 20 carbon atoms. Examples of suitable alkyls are methyl, ethyl, propyl, secondary butyl, tertiary butyl, pentyl, and hexyl. Also acceptable are cycloalkyls containing saturated rings of 5-7 carbon atoms such as cyclopentane, cyclohexane and substituted cyclohexane. Alkene groups of vinyl, allyl, butenyl and pentenyl are acceptable, as are dienyls such as butadienyl and pentadienyl. Mono-unsaturated cyclic hydrocarbon radicals and di-unsaturated cyclic hydrocarbon radicals containing rings with 5-7 carbon atoms are acceptable for the practice of this invention. An example is cyclopentadienyl. Aromatic radicals, substituted aromatics and radicals containing one or more aromatic rings such as naphthyl, tolyl, phenyls, benzyl and dimethylnaphthyl are acceptable as the hydrocarbyl for the practice of this invention.

In the practice of the present invention, one or more of the hydrocarbyl groups could be replaced by a hydrogen ion resulting in a metal hydride. Metal hydrides are generally insoluble in solvents suitable for dissolving polymers. Metal hydrides are often available in solutions in the form of complexes with crown ethers. The complex of a metal hydride and a crown ether is operable as the neutralizing agent of the present invention.

Alkyl groups of 4 or fewer carbon atoms have the advantage of easy removal of reaction by-products from the reaction medium. These lighter alkyls result in gaseous by-product alkanes which readily volatilize from a solution, melt or solid phase reaction.

The quantity of neutralizing agent necessary for the practice of this invention depends upon the moles of acid functionality present in the functionalized polymer and the desired level of neutralization of the acid and anhydride functionality. When the amount of neutralizing agent utilized is less than 80% of stoichiometric with respect to acid and anhydride functionality the neutralizing agent will react quantitatively. For levels of neutralization greater than 80%, an excess of neutralizing agent may be required. Useful quantities of neutralizing agent are in the range from about 5% to about 200% of stoichiometric with respect to acid or anhydride functionality. Quantities of neutralizing agent in a range from about 10% to about 125% of stoichiometric to acid and anhydride functionality are preferred, and in a range from about 10% to 100% are most preferred.

Process

The process of this invention involves contacting the neutralizing agent with the acid or anhydride functionalized polymer. This contacting may be accomplished in solution, in a melt phase, in a slurry or by mixing metal hydrocarbyls with solid polymer particles. A requirement common to all reaction mediums is that the medium allow the elimination of air, water and other protonic contaminates as these contaminates will react with the neutralizing agent and compete with the polymer acid sites. A preferred embodiment is to contact the polymer with metal hydrocarbyl in solution, which allows for most efficient contact between metal hydrocarbyls and the functionalized polymer. Separation of by-product alkanes from the reaction medium is also readily accomplished so a residual is not left with the polymer product.

Optimum solvents for the practice of this invention in a solvent medium meet three requirements. First, the solvent should be non-protonic and non-reactive with the neutralizing agent. A non-protonic solvent is a solvent which does not contain a species capable of donating a proton to another reactant. A protonic solvent, like water or alcohol, will have a tendency to react with the neutralizing agent. Second, the functionalized polymer should be soluble in the solvent. Third, the neutralizing agent should be soluble in the solvent. The requirements of solubility of the polymer and the metal hydrocarbyl generally limit solvents to non-protonic solvents such as tetrahydrofuran, cyclohexane, normal hexane, normal heptane, benzene, diethylether or toluene and mixtures of the above.

The concentration of functionalized polymer in solution is not critical to the practice of this invention. Concentration of functionalized polymer in the solvent reaction medium is preferably from about 1% w to about 20% w, more preferably from about 2% w to about 10% w and most preferably from about 4% w to about 6% w.

The neutralizing agent may be added to the solution of polymer either gradually or rapidly.

Metal hydrocarbyls are typically commercially available in solution with a non-polar solvent. The commercially available solution is typically from 10 to 30% w metal hydrocarbyls. Higher concentration may be pyrophoric and are generally avoided. Such commercially available metal hydrocarbyl solutions may generally be added directly to the functionalized polymer solution in the practice of this invention. Metal hydrocarbyls are also commercially available as solids and suspensions. As solids or suspensions, the metal hydrocarbyls may be used directly, diluted or dissolved in a solvent.

When the present invention is practiced in a solution medium, the reaction of metal hydrocarbyl and acid functionalized polymer proceeds rapidly and nearly stoichiometrically.

The reaction is easily carried out at atmospheric pressure and room temperature. The temperature and pressure of the solution are not critical to the present invention and may be varied widely. At very low temperatures, the reaction rate will be slower requiring longer contact times, and a more dilute polymer solution may be required to maintain the functionalized polymer in solution. At very high temperatures, both the functionalized polymer and the neutralizing agent will degrade. The acceptable temperature for the practice of this invention is between about $-80°$ C. and about $400°$ C. The preferable range is between about $0°$ C. and about $100°$ C. and the most preferable temperature is between about $20°$ C. and about $60°$ C. The pressure of the present invention may vary considerably, and could be between about 1 psia and 2000 psia and a preferable pressure is between about 14 psia and 100 psia.

If a lower alkyl is utilized as the hydrocarbyl group of this invention, the alkane by-product of the reaction of metal hydrocarbyl and acid or anhydride functionalized polymer can volatilize from the solution as the reaction is taking place. If a higher molecular weight hydrocarbyl is utilized, the alkane by-product can be removed from the polymer by precipitation of the polymer.

The ionomer product of this process may be separated from a solution reaction medium by any conventional means. Typical means are by coagulation or stripping. Coagulation is accomplished by adding a second solvent, usually either isopropanol or water, to reduce the solubility of the ionomer. Stripping is accomplished by vaporizing the solvent using heat and/or steam thereby causing the ionomer to precipitate.

A second embodiment of the present invention is to carry out the reaction in a slurry phase. In a slurry phase, the reaction may be carried out much like the solution phase reaction. In a slurry phase reaction medium, it is a requirement of the slurry phase medium that the functionalized polymer is not miscible with the medium. The neutralizing agent is preferably soluble in the medium. The slurry phase reaction is performed at a temperature below the functionalized polymer glass transition temperature (Tg). The functionalized polymer is therefore present in the slurry as a solid phase. It is critical that the slurry be essentially free of protonic contaminates. The temperature and pressure are not critical for the practice of this invention in a slurry medium. Operable temperatures range from below ambient to the lower of the Tg of the functionalized polymer or the temperature at which the functionalized polymer or metal hydrocarbyl degrade. Preferably, the temperature is between about $-80°$ C. and about $400°$ C. and most preferably between about $20°$ C. and about $200°$ C.

The pressure of the slurry phase reaction is not critical, and pressures from 1 psia to 2000 psia are operative. Preferable pressures are between 10 and 200 psia and most preferable are between 14 and 100 psia.

A third embodiment of the present invention is to contact the neutralizing agent and the functionalized polymer in a melt phase. In this embodiment, like the others, it is desirable that air, water and other protonic impurities be excluded. In this embodiment, the neutralizing agent is either injected into a melt of the functionalized polymer or added to the functionalized polymer prior to the functionalized polymer being melted. The neutralizing agent may be either a pure component, or in a solution with a non-protonic solvent. The temperature of a melt phase reaction must be between the Tg of the functionalized polymer and the temperature at which the functionalized polymer or the neutralizing agent degrades. The pressure of the melt phase reaction is not critical to the reaction and a wide range of pressures is operable. A pressure between atmospheric and 5000 psi is preferred.

A fourth embodiment of the present invention is reaction of the neutralizing agent with functionalized polymers with the functionalized polymers in the solid state. As with the other embodiments of the present invention, exclusion of air, water and other protonic contaminates is desirable. Reaction of metal hydrocarbyl in the solid state will not achieve the high level of neutralization possible in other embodiments of the present invention due to the inability of the neutralizing agent to diffuse through the solid functionalized polymer to material which is not near the surface. Nevertheless, lower levels of neutralization may be achieved by a reaction with the polymers in a solid phase. The level of neutralization possible increases as the particle size of the polymer decreases.

Temperatures operable for a solid phase reaction include any temperature up to the lower of (1) the Tg of the functionalized polymer or (2) the temperature at which the neutralizing agent or polymer degrades. Temperatures between about $0°$ C. and about $200°$ C. are preferred, and temperatures between $20°$ C. and $150°$ C. are more preferred.

The pressure of a solid phase reaction is not critical and a wide range of pressures is operable. Pressures between about 1 psia and about 1000 psia are operative.

EXAMPLES

All operations were carried out under anhydrous and anaerobic conditions in a glove box or on a vacuum line. All solvents were purified and distilled over sodium/benzophenone metal. The metal hydrocarbyls were used as purchased from Aldrich Chemical Company. Sec-butyl lithium was purchased as a 12% w solution in cyclohexane. Triethyl aluminum was purchased as a 25.3% w solution in cyclohexane. Diethyl zinc was purchased as a 1.6 molar solution in toluene. Biscyclopentadiene nickel was purchased as a pure solid.

The research polymers employed in this process are listed below in Table 1. Copolymer 1 and Copolymer 2 were metallated then carboxylated as described in U.S. Pat. No. 4,797,447. Analysis of the resulting polymers indicated that —COOH functionality was incorporated onto the polystyrene endblocks of the polymer: 1.15% w for Copolymer 1 and 1.12% w for Copolymer 2. The weight percent —COOH functionality is the weight percent of the total polymer which is —COOH groups.

TABLE 1

| Copolymer | Polymer Blocks | MW of Blocks |
|---|---|---|
| 1 | styrene-ethylene/butylene-styrene (1.5% w —COOH) | 7,500–35,000–7,500 |
| 2 | styrene-ethylene/proplyene (1.12% w —COOH) | 36,000–59,300 |

For the examples, standard batch solutions were made for both Copolymer 1 and 2 in THF. The solutions were generally 5–6% weight polymer. A specific example of this preparation would be to dissolve 16.9 grams of Copolymer 1 in 300 ml THF. For Copolymer 2, a specific example would be to dissolve 45 grams of Copolymer 2 in 750 grams of THF.

EXAMPLE 1: TRIETHYL ALUMINUM 317 grams of a 5.5% w solution of Copolymer 1 was placed in a 1000 ml two neck round bottom flask equipped with a mechanical stirrer on one neck, and a septa over the second neck. While the solution was being stirred, 0.49 grams (1:1 molar ratio of triethyl aluminum to —COOH groups) of triethyl aluminum was quickly syringed into the solution. The solution immediately gelled. Stirring was continued for 30 minutes, and the gel was then left standing for 24 hours. After this time, the rubber was coagulated from a solution of isopropanol, washed with water, and dried for 16 hours in a vacuum oven set at 70° C. The dried polymer was heat pressed to form a clear film. Infrared analysis of the resultant film indicated that 85% of the acid functionality had been converted to salt.

EXAMPLE 2: TRIETHYL ALUMINUM 204 grams of a 6.99% w solution of Copolymer 2 was placed in a 1000 ml two neck round bottom flask equipped with a mechanical stirrer on one neck, and a septa over the second neck. While the solution was being stirred, 1.07 grams (2:1 molar ratio of triethyl aluminum to —COOH groups) of triethyl aluminum was quickly syringed into the solution. The solution immediately gelled. Stirring was continued for one hour. After this time, the copolymer was coagulated from isopropanol, washed with water and dried in a vacuum oven at 70° C. Infrared analysis of a solvent cast film of the copolymer prior to coagulation indicated that 92% of the acid functionality had been neutralized.

EXAMPLE 3: s-BUTYL LITHIUM 320 grams of a 5.5% w solution of Copolymer 1 was placed in a 1000 ml two-neck round bottom flask equipped with a mechanical stirrer on one neck, and a septa over the other neck. 0.27 grams (1:1 molar ratio of s-butyl lithium to —COOH groups) of s-butyl lithium was then syringed into the solution all at once. No gel formation was observed. The reaction solution was then allowed to stir for 90 minutes. The resulting rubber solution was coagulated from the reaction solution by adding isopropanol, washed with water, and dried in a vacuum oven at 70° C. Infrared analysis of a solvent cast film of the neutralized polymer indicated that 79% of the acid functionality has been converted to salt. Titration of the residual acid sites with methanolic KOH indicated that 70% of the acid sites had been reacted.

EXAMPLE 4: s-BUTYL LITHIUM 158 grams of a 6.99% solution of Copolymer 2 was placed in a 1000 ml two-neck round bottom flask equipped with a mechanical stirrer on one neck, and a septa over the second neck. 2.22 grams (1.5:1 molar ratio of s-butyl lithium to —COOH groups) of s-butyl lithium was then quickly syringed into the solution all at once. No gel formation was observed. The reaction solution was stirred for one hour. Immediately the reaction vessel was removed from the glove box and the resulting copolymer was coagulated from solution as a crumb by adding isopropanol. The copolymer crumb was then washed with water, and dried in a vacuum oven at 70° C. Infrared analysis of a solvent cast film of the neutralized polymer indicated 76% of the acid functionality had been converted to salt. Titration of the residual acid sites with methanolic KOH indicated that 83% of the acid sites had been reacted.

EXAMPLE 5: n-BUTYL LITHIUM 9.87 grams of a 5.6% w solution of Copolymer 2 was placed in a 1000 ml two-neck round bottom flask equipped with a mechanical stirrer on one neck, and a septa on the second neck. 1.95 grams (1.5:1 molar ratio of n-butyl lithium to —COOH groups) of n-butyl lithium was then syringed into the polymer solution all at once. No gel formation was observed. The reaction solution was stirred for one hour. The copolymer was then precipitated from the reaction solution by adding isopropanol, washed with water and dried in a vacuum oven at 70° C. Infrared analysis of a solvent cast film of the neutralized copolymer indicated that all of the acid functionality had been converted to salt. Titration of the residual acid sites with methanolic KOH indicated that 96% of the acid sites had been reacted.

EXAMPLE 6: BISCYCLOPENTADIENYL NICKEL 320 grams of a 6.6% w solution of Copolymer 1 was placed in a 1000 ml two-neck round bottom flask equipped with a mechanical stirrer on one neck, and a septa on the second neck. 1.02 grams (1.25:1 molar ratio of biscyclopentadienyl nickel to —COOH groups) of biscyclopentadienyl was added directly as a solid into the solution all at once. No gel formation was observed. The reaction solution was stirred for 90 minutes. The copolymer was then precipitated from the reaction solution by adding isopropanol, washed with water and dried in a vacuum oven set at 70° C. Infrared analysis of solvent cast film of the neutralized polymer indicated that 71% of the acid sites had been converted to salt. Titration of the residual acid sites with methanolic KOH indicated that 60% of the acid sites had been reacted.

EXAMPLE 7: DIETHYL ZINC 250 ml of a 5.0% w solution of Polymer 1 was placed in a 1000 ml two neck flask equipped with a mechanical stirrer on one neck, and a septa over the second neck. While the solution was being stirred, 1.3 grams (1:1 molar ratio of diethyl zinc to —COOH groups) of diethyl zinc was quickly syringed into the polymer solution. The solution immediately gelled. Stirring was continued for one hour. The copolymer was then precipitated from solution by adding isopropanol, water washed and then dried in a vacuum oven set at 70° C. Infrared analysis of a solvent cast film of the copolymer indicated that over 99% of the acid sites had been neutralized.

What we claim is:

1. A process comprising:
  contacting a polymer containing from about one pendant acid group per polymer molecule on the average to about 5 percent by weight of acid groups with a neutralizing agent which can be represented by the formula $MR_x$, wherein M is a metal ion, R is selected independently from the group consisting of hydrogen and hydrocarbyl groups and x is an integer from 1 to 4, under conditions effective for neutralization of at least about 5% of the initial acid functionality of the polymer in a non-protonic solvent.

2. The process of claim 1 wherein the metal ion M is selected from the group consisting of Group IA, IB, IIA, IIB, IIIA, IVA, IVB, VB, VIB, VIIB and VIII metal ions.

3. The process of claim 1 wherein the metal ion M is selected from the group consisting of nickel, aluminum, lithium and zinc ions.

4. The process of claim 1 wherein the neutralizing agent is present in an amount of at least about 10 mole percent and less than about 125 mole percent, based on moles of acid functionality.

5. The process of claim 1 wherein the neutralizing agent is present in an amount of at least about 10 mole percent and less than about 100 mole percent, based on moles of acid functionality.

6. The process of claim 1 wherein R is selected from the group consisting of alkyl groups containing from one to 20 carbon atoms.

7. The process of claim 1 wherein at least one R of the neutralizing agent is a $C_{5-7}$ cycloalkyl group.

8. The process of claim 1 wherein at least one R is substituted or unsubstituted aryl.

9. The process of claim 1 wherein R is selected from the group consisting of ethyl, cyclopentadienyl, secondary butyl and normal butyl.

10. The process of claim 1 wherein the neutralizing agent is selected from the group consisting of triethyl aluminum, secondary butyl lithium, diethyl zinc, n-butyl lithium and biscyclopentadienyl nickel.

11. The process of claim 1 wherein the polymer is a functionalized block copolymer of one or more blocks of polymerized monovinyl aromatic and one or more polymerized blocks of a conjugated diene.

12. The process of claim 1 wherein the solvent is tetrahydrofuran.

13. The process of claim 1 wherein the polymer is contacted with the neutralizing agent in a slurry comprising:
  (a) a first phase comprising the neutralizing agent and a non-protonic solvent; and
  (b) a second phase comprising the functionalized polymer, the functionalized polymer being at a temperature which is above its glass transition temperature.

14. A process comprising:
  contacting a polymer containing from one pendant anhydride group per polymer molecule on the average to about 5 weight percent pendant anhydride groups with a neutralizing agent under conditions effective for reaction with between about 5% to about 100% of the initial anhydride functionality of the polymer in a non-protonic solvent, wherein the neutralizing agent is of the formula $MR_x$, wherein M is a metal ion, R is selected independently from the group consisting of hydrogen and hydrocarbyl groups and x is an integer from 1 to 4.

15. The process of claim 14 wherein the metal ion M is selected from the group consisting of Group IA, IB, IIA, IIB, IIIA, IIIB, IVA, IVB, VB, VIB, VIIB and VIII metal ions.

16. The process of claim 14 wherein the metal ion M is selected from the group consisting of nickel, aluminum, lithium and zinc ions.

17. The process of claim 14 wherein the neutralizing agent is present in an amount of at least about 10 mole percent and less than about 125 mole percent, based on moles of anhydride functionality.

18. The process of claim 14 wherein the neutralizing agent is present in an amount of at least about 10 mole percent and less than about 100 mole percent, based on moles of anhydride functionality.

19. The process of claim 1 wherein R's are selected independently from the group consisting of hydrocarbyl groups.

20. The process of claim 14 wherein R's are selected independently from the group consisting of hydrocarbyl groups.

21. The process of claim 1 wherein at least one R of the neutralizing agent is a hydrogen.

22. The process of claim 14 wherein at least one R of the neutralizing agent is a hydrogen.

* * * * *